United States Patent
Sorrentino (10) Patent No.: US 9,510,353 B2
(45) Date of Patent: Nov. 29, 2016

(54) DEVICES AND METHODS FOR D2D SYNCHRONIZATION SIGNALLING

(71) Applicant: Telefonaktiebolaget LM Ericsson (publ), Stockholm (SE)

(72) Inventor: Stefano Sorrentino, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 8 days.

(21) Appl. No.: 14/407,408

(22) PCT Filed: Nov. 6, 2014

(86) PCT No.: PCT/SE2014/051311
§ 371 (c)(1),
(2) Date: Dec. 11, 2014

(87) PCT Pub. No.: WO2016/043638
PCT Pub. Date: Mar. 24, 2016

(65) Prior Publication Data
US 2016/0088607 A1    Mar. 24, 2016

Related U.S. Application Data

(60) Provisional application No. 62/052,567, filed on Sep. 19, 2014.

(51) Int. Cl.
*H04W 72/04* (2009.01)
*H04W 8/00* (2009.01)
*H04W 56/00* (2009.01)
*H04W 52/02* (2009.01)
*H04W 72/00* (2009.01)
*H04W 92/18* (2009.01)

(52) U.S. Cl.
CPC ........... *H04W 72/048* (2013.01); *H04W 8/005* (2013.01); *H04W 52/0229* (2013.01); *H04W 56/001* (2013.01); *H04W 72/00* (2013.01); *H04W 92/18* (2013.01)

(58) Field of Classification Search
CPC .................................................. H04W 72/048
See application file for complete search history.

(56) References Cited

U.S. PATENT DOCUMENTS

2014/0112194 A1* 4/2014 Novlan ............... H04W 48/16 370/254
2014/0334354 A1* 11/2014 Sartori ................ H04W 8/005 370/280

(Continued)

OTHER PUBLICATIONS

Hanbyul Seo, Method of Interference Coordination among Multiple Device-to-Device Communication Links, Mar. 20, 2013, pp. 1-22.*

(Continued)

*Primary Examiner* — Brian D Nguyen
*Assistant Examiner* — Toan Nguyen
(74) *Attorney, Agent, or Firm* — Christopher & Weisberg, P.A.

(57) ABSTRACT

Embodiments herein relate to a receiver device; a method therein; a transmitter device and a method therein. The transmitter device is configured to transmit to the receiver device a device-to-device synchronization signal during a time window preceding the start of a resource pool. The transmitter device is further configured to transmit a discovery message during the resource pool. The discovery message includes the identity of the transmitter device for enabling the transmitter device and the receiver device to synchronize to each other.

18 Claims, 7 Drawing Sheets

(56) References Cited

U.S. PATENT DOCUMENTS

2014/0342747 A1* 11/2014 Lee .................. H04L 5/0053
455/450
2016/0037549 A1* 2/2016 Seo .................. H04W 76/023
370/329

OTHER PUBLICATIONS

International Search Report and Written Opinion dated May 12, 2015 for International Application No. PCT/SE2014/051311; International Filing Date: Nov. 6, 2014 consisting of 9-pages.

3GPP TSG RAN WG1 Meeting #76, Prague, Czech Republic; R1-140774; Source: Ericsson: Title: "Synhchronization Signals and Channel Design for D2D Discovery and Communication", Agenda: 7.2.8.1.1., Document for: Discussion and Decision, XP050736275; 3rd Generation Partnership Project (3GPP), Mobile Competence Centre; 650, Route des Lucioles; F-06921 Sophia-Antipolis Cedex; France, Feb. 10, 2014 consisting of 8-pages.

3GPP TR 36.843 V1.2.0 (Feb. 2014); "3rd Generation Partnership Project; Technical Specification Group Radio Access Network; Study on LTE Device to Device Proximity Services; Radio Aspects (Release 12)", 3GPP Draft; 36843-120, 3rd Generation Partnership Project (3GPP), Mobile Competence Centre; 650, Route des Lucioles; F-06921 Sophia-Antipolis Cedex; France, Mar. 10, 2014, XP050781448, consisting of 49-pages.

* cited by examiner

DEVICES AND METHODS FOR D2D SYNCHRONIZATION SIGNALLING

TECHNICAL FIELD

Embodiments herein relate to synchronization in general and particularly to devices and methods therein for Device to Device (D2D) synchronization signalling.

BACKGROUND

D2D communication is a well-known and widely used component of many existing wireless technologies, including ad hoc and cellular networks. Examples include Bluetooth and several variants of the IEEE 802.11 standards suite such as WiFi Direct. These systems or technologies operate in unlicensed spectrum.

Recently, D2D communications as an underlay to cellular networks have been proposed as a means to take advantage of the proximity of communicating devices and at the same time to allow devices to operate in a controlled interference environment.

It is suggested that such a D2D communication shares the same spectrum as the cellular system, for example by reserving some of the cellular uplink resources for D2D purposes. Allocating dedicated spectrum for D2D purposes is a less likely alternative as spectrum is a scarce resource and (dynamic) sharing between the D2D services and cellular services is more flexible and provides higher spectrum efficiency.

Devices that want/wish to communicate, or even just discover each other, typically need to transmit various forms of control signaling. One example of such control signaling is the discovery signal; which may include a full message e.g. a synchronization message or a beacon; which at least carries some form of identity and is transmitted by a device that wants/wishes to be discoverable by other devices. Other devices may scan for the discovery signals. Once they have detected the discovery signal, they may take the appropriate action, for example to try to initiate a connection setup with the device transmitting the discovery message.

Multiple discovery signals from different user equipments (UEs), being an example of a device, are multiplexed on the same radio resources in a combination of Time Division Multiplexing (TDM), Frequency Division Multiplexing (FDM) and/or Code Division Multiplexing (CDM). Even though details are not agreed yet at the standardization meeting e.g. 3GPP (Third Generation Partnership Project) or IEEE (Institute of Electrical and Electronics Engineers), it is likely that discovery signals be multiplexed on specific subframes occurring at known (or signaled) positions in a radio frame. Similarly to the discovery signals, it is envisioned that UEs transmit channels for data and/or control information.

D2D discovery may be viewed as an application where UEs sense each other's presence based on detection of periodically broadcasted discovery messages. Each UE transmits one or more discovery messages within configured resources also called a discovery resource pool. The discovery resource pools may be different across cells and they be offset in time due also to synchronization differences between cells. Usually a cell is served by a radio base station or a eNB or eNodeB. This implies that the UEs in one cell may need to synchronize to the resource pools provided by other cells in order to detect the associated discovery messages. One way of providing this synchronization is to associate pools to synchronization signals that are particularly suitable for the purpose.

Resource allocation for discovery includes a discovery period that may even be several seconds long. Within the discovery period, each discovery pool generally spans a small fraction of resources. The discovery resources should be almost contiguous in time for energy efficiency reasons. The discovery resource pool may only span a few tens or hundreds of milliseconds within the discovery period.

Figure 1:
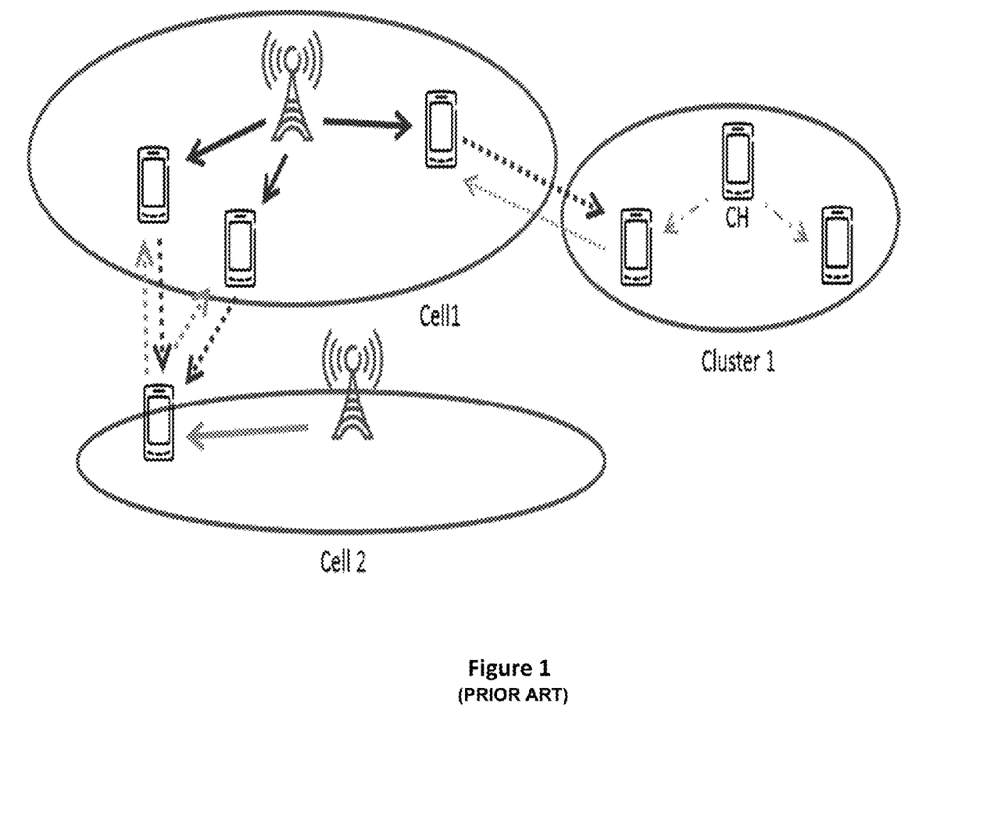
FIG. 1 depicts a network comprising cells and a cluster wherein exemplary embodiments herein may be employed.

Traditional communication in terrestrial radio networks is via links between User Equipments (UEs) and base stations. However, when two UEs are in the vicinity of each other, then direct D2D communication may be considered. Such communication may be dependent on synchronization information from either a base station or a different node such as a cluster head (CH) (a UE acting as synchronization source) providing local synchronization information, or a UE enabled to relay synchronization information from a different synchronization source. The synchronization source from eNB/CH is used for intra-cell/cluster communication. The relayed synchronization signal is used for inter-cell/cluster communication. An illustration of synchronization source from different node is shown in FIG. 1.

Two cells; Cell 1 and Cell 2; and a cluster (Cluster 1) are shown. Each cell is served by a eNB or base station. Cell 1 is shown including three UEs and a eNB. Cell 2 is shown including one UE and a eNB and Cluster 1 is shown including 3 UEs. One of the UEs in Cluster 1 acts as cluster head (CH). Synchronization signals shown in continuous lines are broadcasted by eNBs or base stations. In Cluster 1, CH transmits synchronization signals (dot-dash). Synchronization signals (dotted lines) between UEs (D2Ds) are also shown.

For in-coverage D2D scenarios, the synchronization reference is provided by eNB or base station. So in this case, the D2D resource pool is signaled by eNB to indicate the resource used for D2D. While for out of coverage D2D scenarios, the synchronization reference is provided by CH.

The signal design of D2D Synchronization Signals (D2DSSs) is under discussion in 3GPP. One solution includes differentiating D2DSSs into two sets, one intended to support D2D discovery and the other set intended to support D2D communication.

Figure 2:
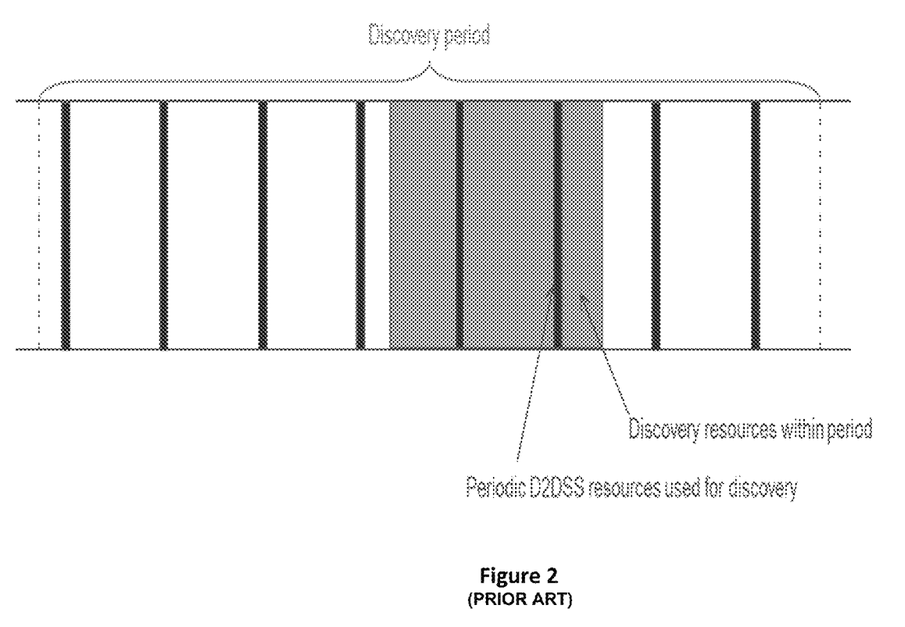
FIG. 2 shows a discovery period used by a UE to transmit and/or receive D2D synchronization signals according to prior art.

Synchronization signals are typically periodically transmitted. The reason is that oscillators tend to drift from their nominal value and periodic corrections based on received synchronization are needed to maintain relative synchronization. Typical synchronization periodicity may be from a few milliseconds to tens or hundreds of milliseconds. FIG. 2 illustrates a discovery period including discovery resources within a pool and periodic D2DSS resources used for discovery. A D2DSS is transmitted periodically within the discovery period. The discovery resources comprise set of time/frequency radio resources. UEs may transmit discovery messages or signals only within such pool, where each discovery message/signal typically occupies a small fraction of the pool resources. Thus, several transmitters may share the same pool by using different resources in the pool. Receivers on the other hand need to monitor the whole pool and attempt detection of any discovery message/signal potentially transmitted in the pool. The discovery message/signal carries some identity associated to the transmitter. Once a discovery message is detected, the receiver becomes aware of the proximity of the associated transmitter.

The periodic synchronization signals may be viewed as fixed overhead that prevent reuse of D2DSS resources for other purpose. There is therefore a need to minimize the overhead. With deployment of D2D on cellular spectrum minimizing the overhead associated to D2D is advantageous. Further, D2D signal transmissions may drain battery life of D2D capable UEs especially if idle UEs transmit such D2DSS signals in a periodic fashion.

SUMMARY

An object of embodiments herein is to alleviate at least one of the problems disclosed earlier. The object of embodiments herein comprises providing a method performed in a receiver device as a well as a receiver device for reducing overhead in a network wherein synchronization signalling is performed. The object of embodiments herein also comprises providing a method performed in a transmitter device as a well as a transmitter device.

According to an aspect of exemplary embodiments, at least some of the above stated problems are solved by means of a method performed by a receiver device. The method comprising: receiving from a controller node (e.g. a eNB), a configuration message (e.g. RRC message), including information of (or indicating) the occurrence (time) of a discovery resource pool within a discovery period. The method further comprising: receiving a least one D2D synchronization signal from a transmitter device and/or the controller node, within a certain time window preceding the discovery resource pool within the discovery period. The method further comprising: receiving, within the discovery resource pool, from the transmitter device, a discovery message comprising an identity of the transmitter device for enabling synchronization between the receiver device and the transmitter device.

According to an aspect of exemplary embodiments, at least some of the above stated problems are solved by means of a receiver device. The receiver device comprises a receiver unit/circuit or module configured to receive from a controller node (e.g. a eNB), a configuration message (e.g. RRC message) including information of (or indicating) the occurrence (time) of a discovery resource pool within a discovery period. The receiver unit/circuit or module is further configured to receive a least one D2D synchronization signal from a transmitter device and/or the controller node, within a certain time window preceding the discovery resource pool within the discovery period. The receiver unit/circuit or module is further configured to receive, within the discovery resource pool, a discovery message, from the transmitter device, comprising an identity of the transmitter device for enabling synchronization between the receiver device and the transmitter device.

According to an aspect of exemplary embodiments, at least some of the above stated problems are solved by means of a method performed by a transmitter device, the method comprising: transmitting D2DS signal(s) to a receiver device within a (certain) time window prior to the beginning of or preceding the start of a discovery resource pool within a discovery period. Information on the timing window when to transmit the D2DSS may be configured by the eNB and signalled to the transmitter device from the controller node (eNB). The method further comprising: transmitting, within the discovery resource pool, a discovery message comprising an identity of the transmitter device, to the receiver device for enabling synchronization between the transmitter device and the receiver device.

According to an aspect of exemplary embodiments, at least some of the above stated problems are solved by means of a transmitter device. The transmitter device comprises a transmitter unit/circuit or module configured to transmit D2DS signal(s) to a receiver device within a (certain) window prior to beginning of or preceding the start of a discovery resource pool within a discovery period. The transmitter unit/circuit or module is further configured to transmit a discovery message comprising an identity of the transmitter device, to the receiver device for enabling synchronization between the transmitter device and the receiver device.

An advantage with embodiments herein is that D2DSSs are transmitted only when needed. The D2DSSs from the transmitter device are transmitted in restricted time positions i.e. withing a time window position preceding the start of the discovery resource pool and/or during the discover resource pool of the discovery period but not during other positions. This way overhead is avoided on other resources which may instead be used for other purposes. Another advantage is that since the overhead is reduced, energy savings at the transmitter and/or receiver devices is achieved.

DETAILED DESCRIPTION

The network wherein the embodiments herein are applied may use access technologies supporting D2D communications or UE2UE communications, such as e.g. Long Term Evolution, LTE-Advanced, Wideband Code Division Multiple Access (WCDMA), High Speed Packet Access (HSPA), Worldwide Interoperability for Microwave Access (WiMax), or Ultra Mobile Broadband (UMB), just to mention a few possible implementations. Although the terminology from Third Generation Partnership Project (3GPP) LTE and D2D is used in this disclosure to exemplify the different embodiments, this should not be seen as limiting the scope of the embodiments to only the aforementioned system. Other wireless systems, including WCDMA, UTRA FDD, UTRA TDD, WiMax, WLAN, UMB and GSM/GERAN/EDGE, may also benefit from exploiting the ideas covered within this disclosure.

Also note that terminology such as eNodeB or eNB, and UE or device should be considering non-limiting and does in particular not imply a certain hierarchical relation between the two; in general "eNodeB or eNB" could be considered as device 1 and "UE" device 2, and these two devices communicate with each other over some radio channel. Further by transmitter device or transmitter UE is meant a device or a D2D capable UE.

According to an embodiment herein, Device-to-Device Synchronization signals (D2DSSs) are configured to be transmitted in resources that are within or close to the discovery resource pool but that do not coincide with the beginning/start of the subframe used for transmitting the resource pool. By doing this D2DSS overhead can be avoided when not needed (e.g., far away in time from the discovery pools). Hence, instead of transmitting the D2DSS signals in a periodic fashion during the whole discovery period, the D2DSS signals are instead restricted to the region wherein the pool is configured i.e. preceding the pool and within the pool but not in other positions or regions.

According to an embodiment, D2DSS transmission rules may be defined that allow D2D UE receivers to synchronize to D2DSS transmitted by a D2DSS transmitter without wasting discovery resources. The rules allow the receiver to assume that a D2DSS is always available within a certain time window preceding the discovery resources or pool, allowing the UE to synchronize to D2DSS compatibly with its processing latency.

Figure 3:
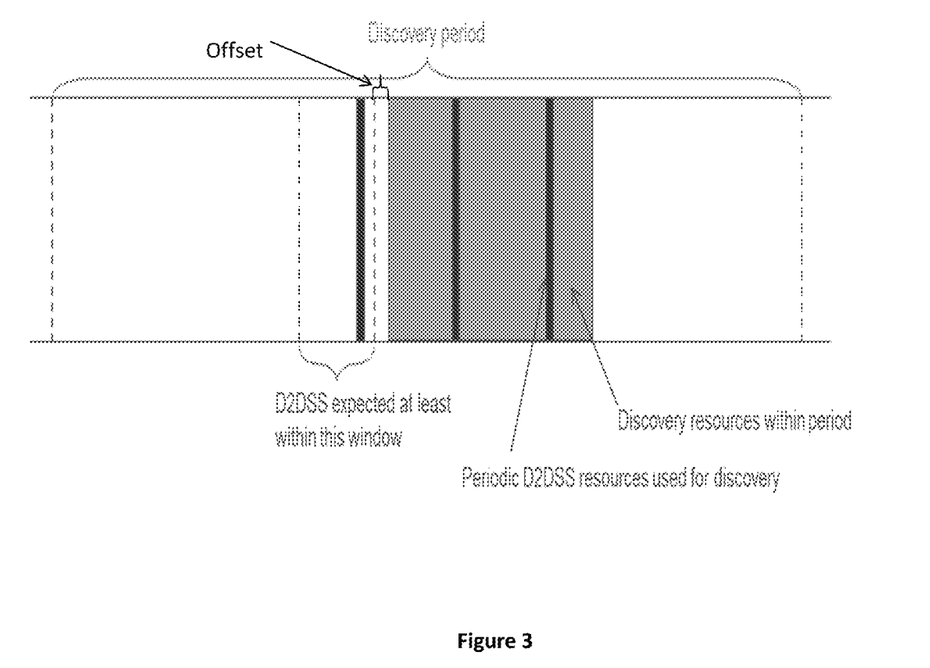
FIG. 3 shows a discovery period used by a UE to transmit and/or receive D2D synchronization signals according to an exemplary embodiment herein.

A first example of the embodiment herein is shown FIG. 3. As shown D2DSS signals, useful for assisting D2D are transmitted only close in time to the D2D resource allocation or discover resource pool. The discovery resource pool is shown in grey and denoted in FIG. 3 "Discovers resources within period". By period is meant the discovery period which is also shown. This means that within each discovery period a D2DSS is not transmitted by the UEs if the D2DSS resource occurs before or after the set of resources allocated for the discovery pool. However, if D2DSS occurs within the contiguous or almost contiguous set of resources allocated to the pool, then D2DSS is transmitted. In this example shown in the Figure, the D2DSS is transmitted only close to the associated resource pool. Resource pool may be used for discovery and/or communication purposes. With associated resource pool is meant a pool that may be detected by taking advantage of D2DSS. E.g., D2DSS and the resource pool are associated to the same cell or transmitted by UEs belonging to the same cell. The advantage of this embodiment is that D2DSS is transmitted only when needed and overhead is avoided on other resources. The resources to be used for D2DSS may be indicated in any implicit or explicit way. E.g., the controller node (eNB) may explicitly indicate through e.g. RRC (Radio Resource Control) signalling or higher layer signalling to UEs transmitting and/or receiving D2DSS that it should be transmitted with a certain periodicity, a certain number of instances/occurrences (or over a certain time) and with a certain time offset with respect to some system time or subframe index e.g. the index indicating the beginning of the subframe where the pool is configured.

In another example the D2DSS instances are defined by a periodicity and an offset and D2DSS is transmitted only on those instances that are close to the resource pool, according to a predefined rule. An example of a rule is that only D2DSS instances that occur within the duration of the resource pool within a discovery period are transmitted. For example, a D2DSS is only allowed to be transmitted and/or received within the resource pool. Another example of a rule it to allow D2DSS instances for transmission to occur within the duration of the resource pool within a discovery period, plus one or more D2DSS instances immediately preceding the resource pool (as shown in FIG. 3). This is to allow the D2D receiver to adjust its synchronization prior to the reception of the pool.

A further embodiment herein comprises defining properties that characterize the D2DSS resource allocation according to the rules or configuration and signaling defined above. In one example, the D2D receiver may assume or be informed by the eNB or the D2D transmitter that at least a certain known number of D2DSS transmissions will be received by the receiver prior to reception of the resource pool within the discovery period. In a further example the receiver may assume or be informed that the D2DSS received prior to the start of the resource pool occurs at most within a certain time offset from the start of the pool. The offset may be related to the capacity of the UE to maintain synchronization over time and it may be predefined or signaled in to the receiver from the eNB or controller node. The offset may further be related to the D2DSS processing time in the UE and it can be predefined or signaled in to the receiver. In a further example the UE receiver may expect or be informed that at least a certain known number of D2DSSs are received within a certain time window prior to the start of the resource pool. This is shown in FIG. 3 where only a signal D2DSS is shown received with the window denoted "D2DSS expected at least within this window". An example of the offset is also shown starting at the end of the window and ending at the start of the recourse pool.

Figure 4:
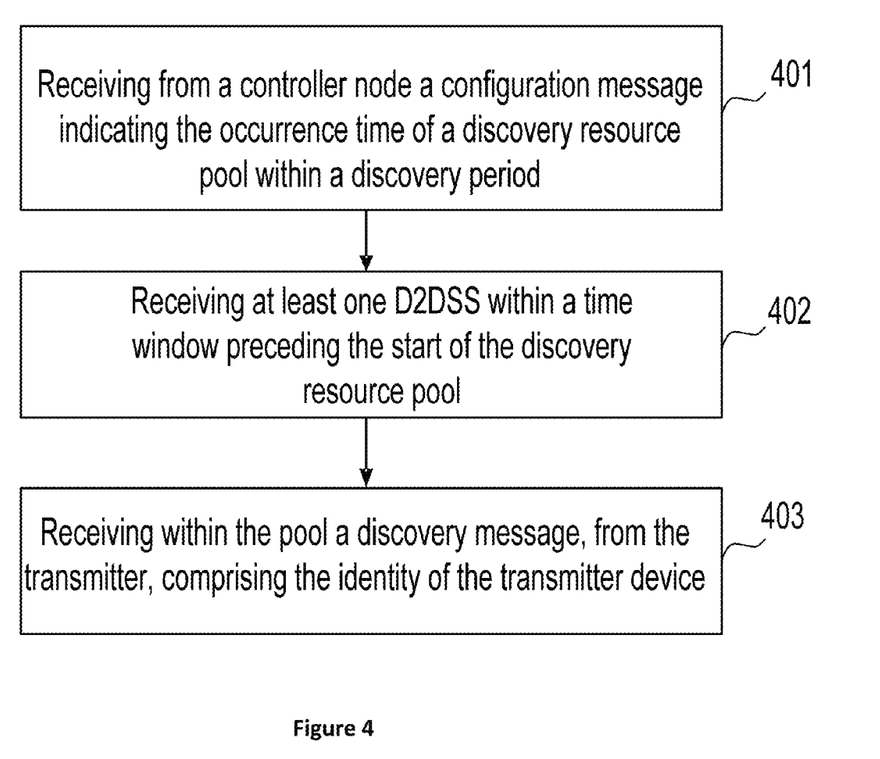
FIG. 4 illustrates a method in a receiver device in accordance with some exemplary embodiments herein.

Referring to FIG. 4 there is illustrated a method performed by a receiver device in accordance with exemplary embodiments herein. The receiver device is configured to receive from a transmitter device, D2D synchronization signal(s) and a discovery message including an identity of the transmitter device. The method comprising: 401 receiving from a controller node (e.g. a eNB), a configuration message (e.g. RRC message), including information of (or indicating) the occurrence (time) of a discovery resource pool within a discovery period. The method further comprising: 402 receiving a least one D2D synchronization signal from a transmitter device and/or the controller node, within a certain time window preceding the start of the discovery resource pool within the discovery period. The method further comprising: receiving at least one D2D discovery message, from the transmitter device or from the controller node, within the duration of the discovery resource pool. The discovery message comprises the identity of the transmitter device for enabling the receiver device and the transmitter device to discover and synchronize to each other.

According to an embodiment, information on the time window preceding the occurrence of the duration of the discovery resource pool may be determined by the receiver device based on received information indicating the occurrence of the discovery resource pool received in the configuration message.

The time window should be small (so that the UE receiver device does not lose synchronization within the time window) and sufficiently earlier than the discovery resources (or pool) to allow the UE receiver device to process synchronization before receiving the D2D discovery signals. This is to allow the receiver to adjust its synchronization prior to the reception of the pool. By sufficiently earlier than the occurrence of the discovery resource pool is meant a certain time offset with respect to some system time or subframe index e.g. the index indicating the beginning or start of the subframe where the pool is configured, as previously described. The time offset may be signalled from the controller node or determined by the receiver device. The time offset may also be pre-configured in the receiver device. According to an embodiment, the method further comprises receiving a D2DSS within/during the discovery resource pool of the discovery window.

The discovery resource pool may be defined by use of a bitmap indicating used subframes within a certain set of resources (e.g., a certain number of uplink subframes). With "start of resource pool" is considered for example the first used resource within the resource pool bitmap or all the resources spanned by the bitmap. Exceptions to the above rules may occur when the pools are close to the system number (SFN) boundary (in LTE the SFN is periodic 0 . . . 1023) and/or when the pools occur close to the beginning of the discovery period. In this case the above rules or the window may be shortened accordingly in order to avoid spanning multiple discovery periods or multiple SFN periods.

By defining when the receiver device shall receive the D2DSS as explained before, overhead is minimized.

Figure 5:
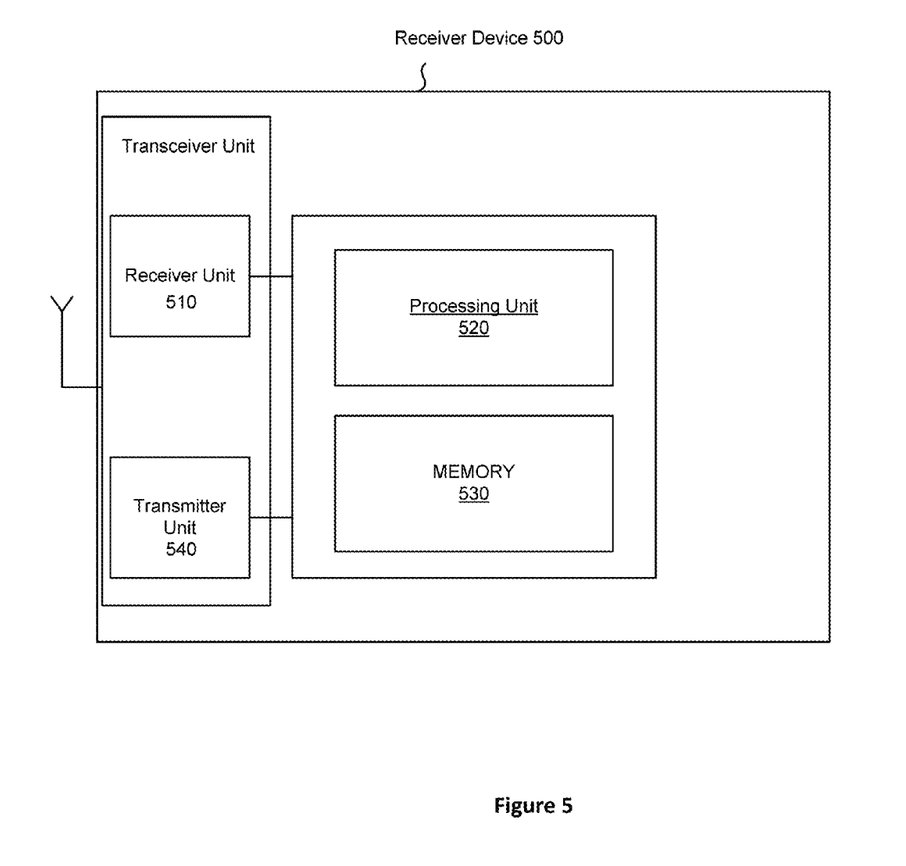
FIG. 5 illustrates a block diagram depicting a receiver device according to exemplary embodiments herein.

FIG. 5 illustrates an exemplary block diagram depicting a receiver device 500 according to exemplary embodiments herein. The receiver device 500 comprises a receiver unit/circuit or module 510 configured to receive from a controller node (e.g. a eNB), a configuration message (e.g. RRC message) including information of (or indicating) the occurrence of a discovery resource pool within a discovery period. The receiver unit/circuit or module 510 is further configured to receive a least one D2D synchronization signal from a transmitter device and/or the controller node, within a (certain) time window preceding the start of the discovery resource pool within the discovery period. The receiver unit/circuit module 510 is further configured to receive a discovery message including an identity of the transmitter device for enabling synchronization with the transmitter device.

The receiver unit/circuit or module 510 is further configured to receive at least one D2D synchronization signal, from the transmitter device or from the controller node, within the duration of the discovery resource pool. As mentioned earlier, information on the time window preceding the occurrence of the duration of the discovery resource pool may be determined by the receiver device 500 based on the information indicating the occurrence of the discovery resource pool. The information on the time window may be, in another embodiment, received from the controller node (or eNB) in a configuration message e.g. a RRC message. The time window should be small (so that the UE receiver device does not lose synchronization within the time window) and sufficiently earlier than the discovery resources (or pool) to allow the UE receiver device to process synchronization before receiving the D2D discovery signals and also before receiving the discovery message. This is to allow the receiver to adjust its synchronization prior to the reception of the pool and/or the discovery message. Adjustment of the synchronization may be performed by processing unit or module 520 comprised in the receiver device 500. Also, the processing of received synchronization signals may be performed by processing unit or module 520. As mentioned before, by sufficiently earlier than the occurrence of the discovery resource pool is meant a certain time offset with respect to some system time or subframe index e.g. the index indicating the beginning or start of the subframe where the pool is configured. The time offset may be signalled from the controller node to receiver device 500 or determined by the receiver device 500 by means of e.g. the processing unit or module 520. The time offset may also be pre-configured in the receiver device in e.g. memory means 530 of the receiver device 500. As shown in FIG. 5, the receiver device further comprises a transmitter unit or module 540 configured to send signalling messages to the transmitter device and/or the controller node for synchronization purposes. The receiver unit or module 510 and transmitter unit or module 540 may be part of or form a transceiver unit or module. The receiver device 500 may further comprise an antenna as shown which may be internal or external. Other units/circuits/modules may be included.

It should be mentioned that the embodiments herein may be implemented through one or more processors or processing units e.g. processing circuit or unit of the receiver device 500 or UE together with a computer program code for performing the functions and/or method steps of the embodiments. For example, for the receiver device 500 comprising the processor 520 and the memory 530, the memory 530 containing instructions executable by the processor 520 whereby the receiver device is operative to perform at least the method steps shown in FIG. 4 and described in the appended claims relating to the transmitter device 500. The computer program code includes the instructions which when executed on at least one processor cause the at least one processor to carry out the method according to the steps above. A carrier containing the computer program, wherein the carrier is one of an electronic signal, optical signal, radio signal, or computer readable storage medium is also provided.

Figure 6:
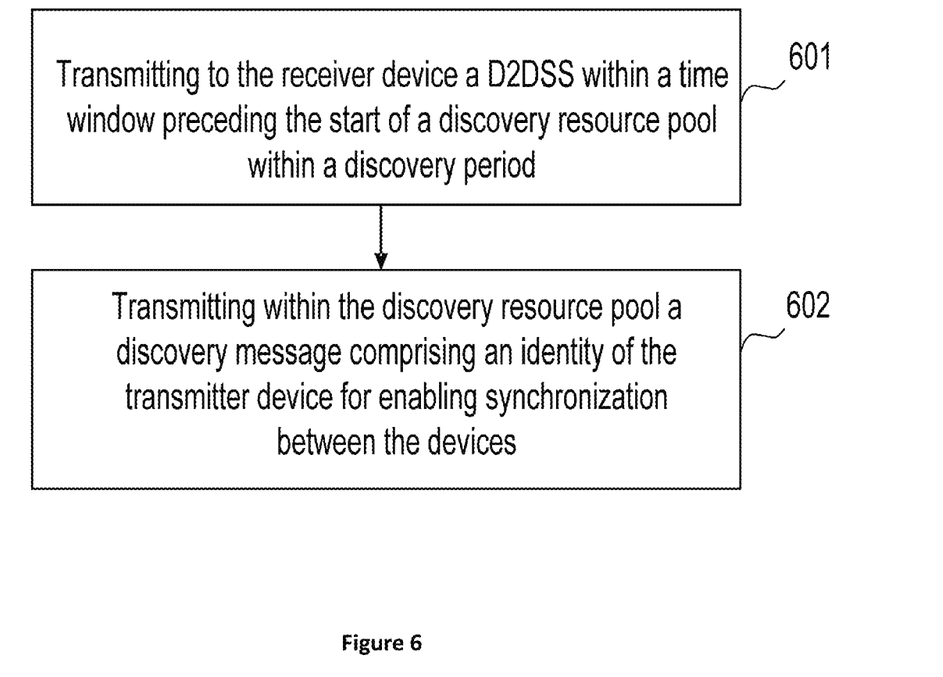
FIG. 6 illustrates a method in a transmitter device in accordance with some exemplary embodiments herein.

According to an embodiment, corresponding steps may be performed at the D2DSS transmitter device and/or at the controller node (eNB) that determines the behavior of the D2DSS transmitter device. E.g., D2DSS resource allocation is freely configured by the eNB provided that at least one D2DSS is transmitted within a certain time window prior to the associated resource pool. The start and end points of the time window are relative to the start of the resource pool. A method performed by a transmitter device is shown in FIG. 6 and it comprises: 601 transmitting D2DS signal(s) to a receiver device within a (certain) time window prior to beginning of (or preceding the start of) a resource pool within a discovery period. Information on the timing window when to transmit the D2DSS may be configured by the eNB and signalled to the transmitter device from the controller node (eNB) in a RRC message. The method further comprising: 602 transmitting discovery messages(s) including an identity of the transmitter device, to the receiver device for enabling synchronization/discovery between the devices. The discovery message transmitted within the discovery resource pool of the discovery period. The method further comprises transmitting D2DSS signals within a discovery resource pool as previously described.

Figure 7:
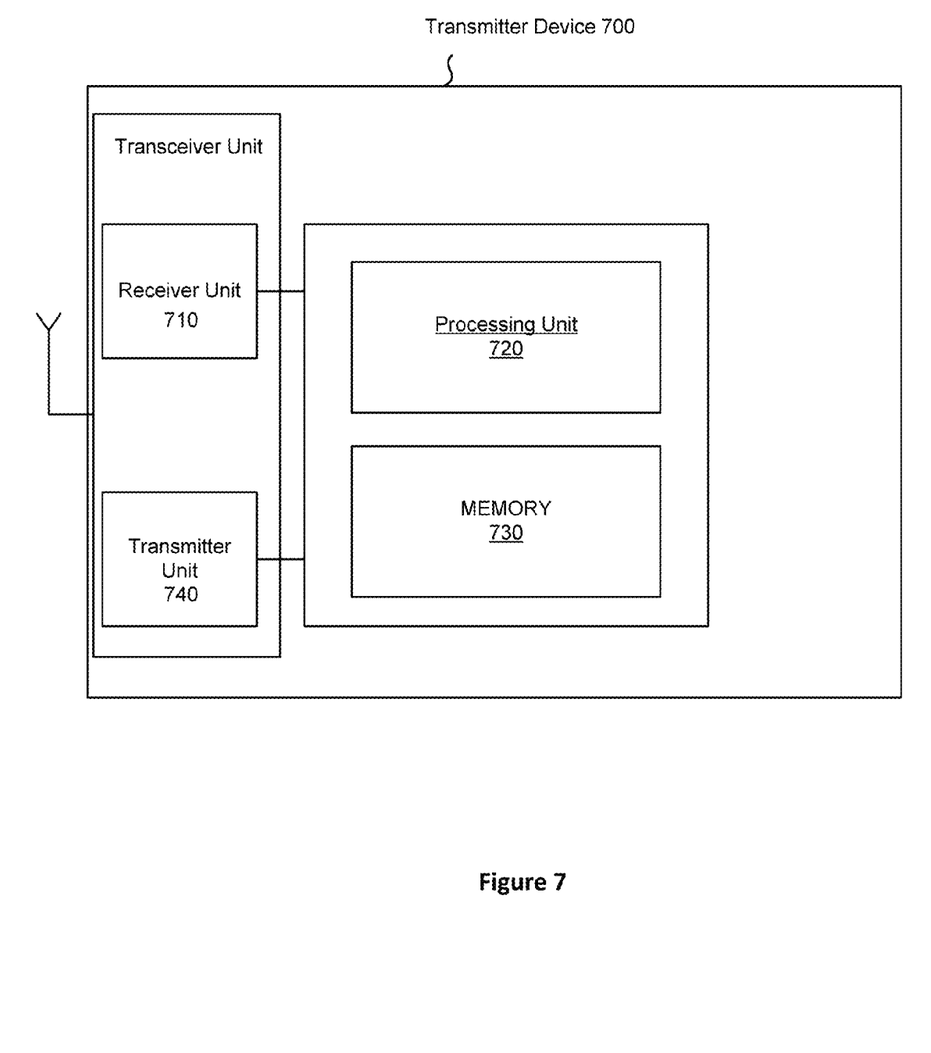
FIG. 7 illustrates a method in a transmitter device in accordance with some exemplary embodiments herein.

According to an embodiment, a transmitter device is provided performing the steps described above. FIG. 7 illustrates an exemplary block diagram depicting a transmitter device 600 according to exemplary embodiments herein. The transmitter device 700 comprises a transmitter unit/circuit or module 740 configured to transmit D2DS signals to a receiver device within a certain window prior to the beginning (or preceding the start) of a discovery resource pool within a discovery period. Information on the timing window when to transmit the D2DSS may be configured by the eNB and signalled to the transmitter device 700 from the controller node (eNB). Hence, the transmitter device 700 is configured receive by means of a receiver unit/circuit or module 710 information on the time window when to transmit the D2DSS to the receiver device. The information may be stored in memory unit/circuit means or module 730. The transmitter unit/circuit or module 740 is further configured to transmit discovery message(c) including an identity of the transmitter device, to the receiver device for enabling synchronization between the devices. The transmitter unit/circuit or module 740 is further configured to transmit to the receiver device a D2DSS within the discovery resource pool. The transmitter device 700 further comprises a processing unit/circuit or module 720 configured to process signals received from the controller node or synchronization signals received from other devices. Hence, the transmitter device 700 also comprises a receiver unit/circuit or module 710 for that purpose.

Similarly, for the transmitter device 700 comprising the processor 720 and the memory 730, the memory 730 containing instructions executable by the processor 720 whereby the transmitter device is operative to perform at least the method steps shown in FIG. 6 and presented in the appended claims relating to the method for the transmitter device 700. Also here a computer program code is provided including the instructions which when executed on at least one processor, cause the at least one processor to carry out the method according to steps above. A carrier containing the computer program, wherein the carrier is one of an electronic signal, optical signal, radio signal, or computer readable storage medium is also provided.

Those skilled in the art will also appreciate that the various "circuits" or "units" or "modules" described may refer to a combination of analog and digital circuits, and/or one or more processors configured with software and/or firmware (e.g., stored in memory). One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Throughout this disclosure, the word "comprise" or "comprising" has been used in a non-limiting sense, i.e. meaning "consist at least of". Although specific terms may be employed herein, they are used in a generic and descriptive sense only and not for purposes of limitation.

The invention claimed is:

1. A method performed by a receiver device for synchronizing with a transmitter device; the method comprising:
   receiving from a controller node, a configuration message including information indicating the occurrence of a discovery resource pool within a discovery period;
   receiving, from the controller node, in a radio resource control message, information on a time window;
   receiving at least one device-to-device synchronization signal within the time window preceding the start of the discovery resource pool, the time window preceding the start of the discovery resource pool being based on one of (a) a system time and (b) a subframe index indicating a start of a subframe where the discovery resource pool is configured;
   adjusting synchronization by processing the received at least one device-to-device synchronization signal prior to the receipt of a discovery message from the transmitter device; and
   receiving, within the discovery resource pool, the discovery message from the transmitter device comprising an identity of the transmitter device.

2. The method according to claim 1, further comprising determining information on the time window based on the information indicating the occurrence of the discovery resource pool received in the configuration message.

3. The method according to claim 1, further comprising processing the device-to-device synchronization signal prior to receiving the discovery message.

4. A method according to claim 1, further comprising receiving, from the transmitter device, a device-to-device synchronization signal within the discovery resource pool.

5. The method according to claim 1, further comprising transmitting, to the receiver device a device-to-device discovery signal within the discovery resource pool.

6. The method according to claim 1, wherein the processing unit is further configured to process the device-to-device synchronization signal prior to receiving the discovery message.

7. A method performed by a transmitter device for synchronizing with a receiver device, the method comprising:
   transmitting, to the receiver device, a device-to-device synchronization signal within a time window preceding the start of a discovery resource pool within a discovery period, the time window preceding the start of the discovery resource pool being based on one of (a) a system time and (b) a subframe index indicating a start of a subframe where the discovery resource pool is configured;
   generating a discovery message, the discovery message comprising an identity of the transmitter device for enabling synchronization between the transmitter device and the receiver device;
   transmitting within the discovery resource pool, the discovery message to the receiver device; and
   receiving, from a controller node, in a radio resource control message, information on the time window.

8. The method according to claim 7, wherein the information on the time window indicates when to transmit the device-to-device synchronization signal to the receiver device.

9. A receiver device for synchronizing with a transmitter device, the receiver device comprising a receiver circuit and a processing unit:
   the receiver circuit configured to receive, from a controller node, a configuration message including information indicating the occurrence of a discovery resource pool within a discovery period;
   the receiver circuit is further configured to receive, from the controller node, in a radio resource control message, information on a time window;
   the receiver circuit is further configured to receive at least one device-to-device synchronization signal within the time window preceding the start of the discovery resource pool, the time window preceding the start of the discovery resource pool being based on one of (a) a system time and (b) a subframe index indicating a start of a subframe where the discovery resource pool is configured;
   the processing unit configured to adjust synchronization by processing the received at least one device-to-device synchronization signal prior to the receipt of a discovery message from the transmitter device; and
   the receiver circuit is further to receive, within the discovery resource pool, a discovery message, from the transmitter device, comprising an identity of the transmitter device.

10. The receiver device according to claim 9, wherein the processing unit is further configured to determine information on the time window based on the information indicating the occurrence of the discovery resource pool received in the configuration message.

11. The receiver device according to claim 10, wherein the processing unit is further configured to process the device-to-device synchronization signal prior to the receiver circuit receiving the discovery message.

12. The receiver device according to claim 11, wherein the receiver circuit is further configured to receive, from the transmitter device, a device-to-device synchronization signal within the discovery resource pool.

13. The receiver device according to claim 9, wherein the processing unit is further configured to process the device-to-device synchronization signal prior to the receiver circuit receiving the discovery message.

14. The receiver device according to claim 9, wherein the receiver circuit is further configured to receive, from the transmitter device, a device-to-device synchronization signal within the discovery resource pool.

15. A transmitter device for synchronizing with a receiver device; the transmitter device comprising:
   a transmitting circuit configured to transmit, to the receiver device, a device-to-device synchronization signal within a time window preceding the start of a discovery resource pool within a discovery period, the time window preceding the start of the discovery resource pool being based on one of (a) a system time and (b) a subframe index indicating a start of a subframe where the discovery resource pool is configured;
   a processing unit configured to generate a discovery message, the discovery message comprising an identity of the transmitter device for enabling synchronization between the transmitter device and the receiver device;
   the transmitter circuit is further configured to transmit, within the discovery resource pool, the discovery message to the receiver device; and
   a receiver unit configured to receive, from a controller node, in a radio resource control message, information on the time window.

16. The transmitter device according to claim 15, wherein the information on the time window indicates when to transmit the device-to-device synchronization signal to the receiver device.

17. The transmitter device according to claim 16, wherein the transmitter circuit is further configured to transmit, to the receiver device, a device-to-device synchronization within the discovery resource pool.

18. The transmitter device according to claim 15, wherein the transmitter circuit is further configured to transmit, to the receiver device, a device-to-device synchronization within the discovery resource pool.

* * * * *